(12) United States Patent
Sugahara

(10) Patent No.: US 8,339,393 B2
(45) Date of Patent: Dec. 25, 2012

(54) THREE-DIMENSIONAL MAP DATA GENERATING SYSTEM, THREE-DIMENSIONAL MAP DATA GENERATING METHOD AND THREE-DIMENSIONAL MAP DATA GENERATING PROGRAM

(75) Inventor: Hiroto Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 870 days.

(21) Appl. No.: 12/515,483

(22) PCT Filed: Nov. 21, 2007

(86) PCT No.: PCT/JP2007/072523
§ 371 (c)(1),
(2), (4) Date: May 19, 2009

(87) PCT Pub. No.: WO2008/062819
PCT Pub. Date: May 29, 2008

(65) Prior Publication Data
US 2010/0060631 A1    Mar. 11, 2010

(30) Foreign Application Priority Data
Nov. 21, 2006    (JP) .................................. 2006-314261

(51) Int. Cl.
*G06T 1/00* (2006.01)
*G06T 15/00* (2006.01)
*G06T 17/00* (2006.01)
*G06T 15/10* (2006.01)
*G06T 15/20* (2006.01)

(52) U.S. Cl. ...................... 345/419; 345/427; 345/420

(58) Field of Classification Search .................. None
See application file for complete search history.

(56) References Cited

U.S. PATENT DOCUMENTS 6,295,066 B1 * 9/2001 Tanizaki et al. ............... 345/419
7,343,268 B2 * 3/2008 Kishikawa ........................ 703/1

FOREIGN PATENT DOCUMENTS

JP    1993027677 A    2/1993
(Continued)

OTHER PUBLICATIONS

Fruh, C.; Zakhor, A.; , "3D model generation for cities using aerial photographs and ground level laser scans," Computer Vision and Pattern Recognition, 2001. CVPR 2001. Proceedings of the 2001 IEEE Computer Society Conference on , vol. 2, No., pp. II-31-II-38 vol. 2, 2001.*

(Continued)

Primary Examiner — Kee M Tung
Assistant Examiner — Zhengxi Liu

(57) ABSTRACT

A three-dimensional map data creation system and a three-dimensional map data creation method ensuring high in a height direction of a structure near a base station of a wireless communication system so as to highly accurately estimate radio propagation characteristics from the base station of the wireless communication system are provided. An external shape of each of structures is acquired from already acquired two-dimensional map data and a height is acquired using a photograph in which structures described in the two-dimensional map data are imaged. At that time, as the photograph, a photograph taken from a floor identical to a floor on which a base station antenna of the wireless communication system that provides a wireless communication service is disposed in an area including one of the structures.

45 Claims, 13 Drawing Sheets

FOREIGN PATENT DOCUMENTS

| | | |
|---|---|---|
| JP | 2000074669 A | 3/2000 |
| JP | 2000121360 A | 4/2000 |
| JP | 2000123198 A | 4/2000 |
| JP | 2000329552 A | 11/2000 |
| JP | 2001143104 A | 5/2001 |
| JP | 2002031528 A | 1/2002 |
| JP | 2002189412 A | 7/2002 |
| JP | 2003005628 A | 1/2003 |
| JP | 2003006680 A | 1/2003 |

OTHER PUBLICATIONS

Seong-Cheol Kim; Guarino, B.J., Jr.; Willis, T.M., III; Erceg, V.; Fortune, S.J.; Valenzuela, R.A.; Thomas, L.W.; Ling, J.; Moore, J.D.;, "Radio propagation measurements and prediction using three-dimensional ray tracing in urban environments at 908 MHz and 1.9 GHz," Vehicular Technology, IEEE Transactions on, vol. 48, No. 3, pp. 931-946, May 1999.*

David Liebowitz; Antonio Criminis; Andrew Zisserman, "Creating Architectral Models from images," Computer Graphics Forum (1999) vol. 18, Issue: 3, Publisher: Eurographics Association and Blackwell Publishers Ltd 1999, pp. 39-50.*

Jinhui Hu; Suya You; Neumann, U.;, "Approaches to large-scale urban modeling," Computer Graphics and Applications, IEEE, vol. 23, No. 6, pp. 62-69, Nov.-Dec. 2003.*

Lukas Zebedin, Andreas Klaus, Barbara Gruber-Geymayer, Konrad Karner, Towards 3D map generation from digital aerial images, ISPRS Journal of Photogrammetry and Remote Sensing, vol. 60, Issue 6, Sep. 2006, pp. 413-427.*

International Search Report for PCT/JP2007/072523 mailed Dec. 25, 2007.

M. Takagi et al., "Handbook for Image Analysis, New Edition", pp. 1319-1349, University of Tokyo Press, 2004.

J. Sato, "Computer Vision-Vision Geometry", pp. 30-38 and 146-149, Corona Publishing Co., Ltd., 1999.

* cited by examiner

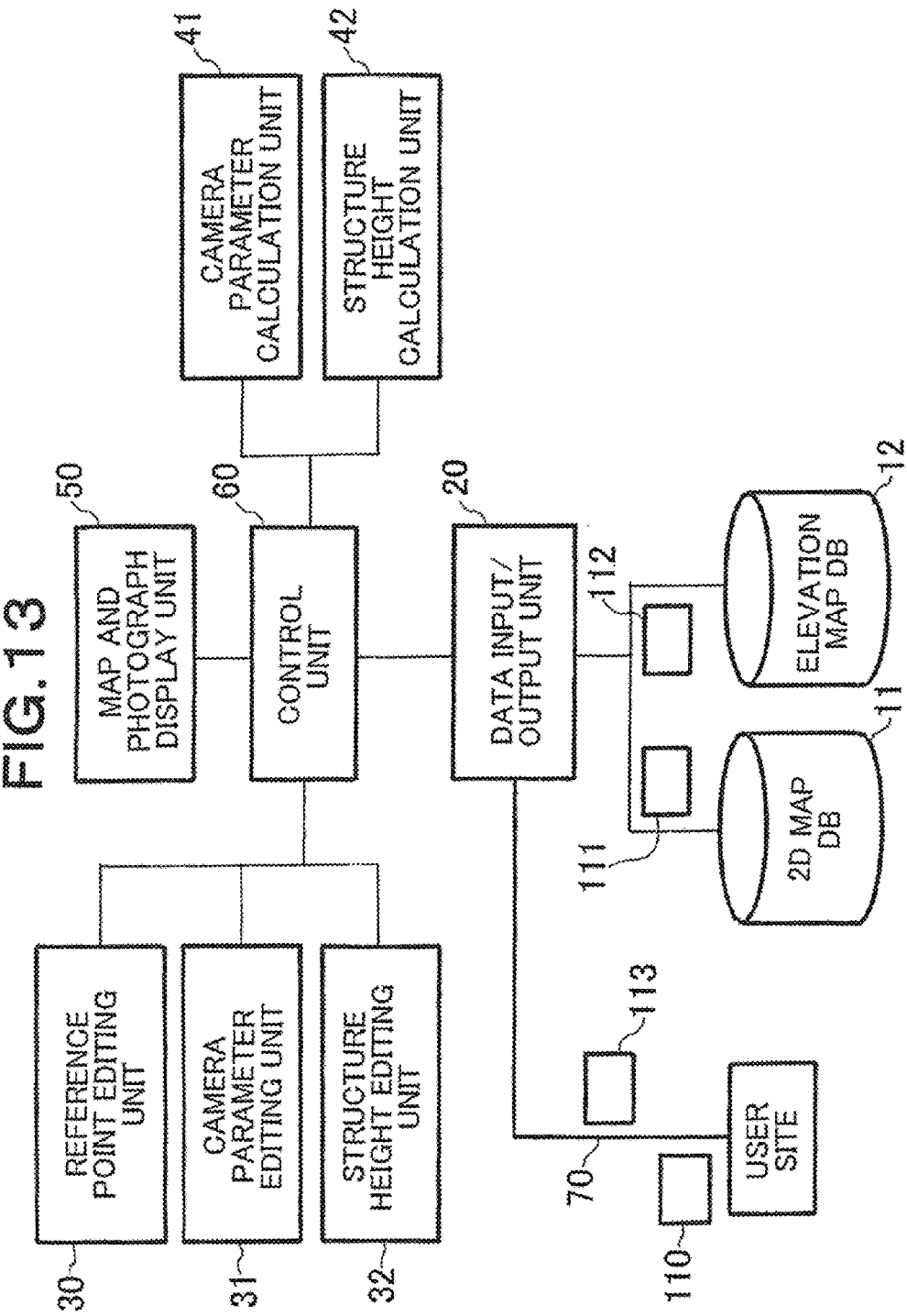

THREE-DIMENSIONAL MAP DATA GENERATING SYSTEM, THREE-DIMENSIONAL MAP DATA GENERATING METHOD AND THREE-DIMENSIONAL MAP DATA GENERATING PROGRAM

TECHNICAL FIELD

The present invention relates to a three-dimensional map data creation system, a three-dimensional map data creation method and a three-dimensional map data creation program. The present invention particularly relates to a three-dimensional map data creation system, a three-dimensional map data creation method and a three-dimensional map data creation program for highly accurately estimating radio propagation characteristics from a base station in a wireless communication system.

BACKGROUND ART

A radio propagation characteristics estimation system (radio propagation simulator) is used to assist in arrangement of base stations, base units and the like in a wireless communication system and optimization of parameters for the arranged base stations, base units and the like. To highly accurately estimate radio propagation characteristics, it is necessary to accurately grasp positions and shapes of obstacles present around the base stations and base units serving as radio wave transmitting or receiving points and deterministically consider those positions and shapes. For example, if one of the base stations of the wireless communication system is disposed outdoor, electronic map data in which three-dimensional (hereinafter, "3D map data") shapes of structures around the base station are accurately stored is necessary.

Conventional methods of creating 3D map data are roughly divided into the following two methods. A first method uses photographs, such as air photographs or satellite photographs, of a data creation target taken from the above. In particular, a stereo imaging method of obtaining a 3D shape of each structure serving as the data creation target by using photographs of the structure taken from two different points and using a disparity between the two photographs is often used. Non-Patent Document 1, for example, discloses the stereo imaging method in detail.

According to the first method, the photographs of an upper surface of each structure are taken in a front view direction. Due to this, external shape information on orthographic projection of the upper surface of the structure can be highly accurately obtained. On the other hand, since the structure is photographed almost in a direction perpendicular to a height of the structure, height information is compressed in each photograph. As a result, an influence of quantization error generated when the photographs are digitized or man-made error generated when an operator extracts feature points of the structure increases, thereby deteriorating accuracy of the height information as compared with the external shape. Furthermore, if other structures are closed together around the data creation target structure, an influence such as shielding of the feature points of the creation target structure often causes further deterioration in accuracy.

A second method for creating 3D map data uses photographs taken by an on-vehicle camera. Patent Document 1, for example, discloses a method including taking photographs of each structure from a moving measuring vehicle on which two cameras are mounted and obtaining height information on the structure based on 3D imaging position data and photographic conditions (a horizontal angle and a vertical angle of a camera visual line, a zoom coefficient and the like) at an instance of photographing.

According to the second method, the height information on the structure can be obtained accurately if the structure is along a road on which the moving measurement vehicle can travel. However, if the structure is not along the road and invisible from the road, the height information on the structure cannot be obtained. Moreover, many structures often have such structures as an attached penthouse and a signboard provided on a roof thereof. If such a structure is invisible from the road, data on the structure cannot be obtained. However, if a created 3D map is applied to a car navigation system, a structure invisible from a road or low accuracy of the structure does not pose serious problems since it is important that information on structures visible to a driver on the road is reproduced with high accuracy.

{Citation List}
{Patent Literature}
JP-A-2003-006680
{Non Patent Literature 1}
Mikio TAKAGI and Akihisa SHIMODA, "Handbook for Image Analysis, New Edition", pp. 1319-1349, University of Tokyo Press, 2004;
{Non Patent Literature 2}
Jun Sato, "Computer Vision-Vision Geometry", pp. 30-38 and 146-149, Corona Publishing Co., Ltd.

SUMMARY OF INVENTION

Technical Problem

However, problems with the conventional techniques become serious if the 3D map is applied to estimation of radio propagation in a wireless communication system. In the estimation of radio propagation in the wireless communication system, it is important to obtain information on external shapes and heights of structures near each base station and structures located at positions visible from the base station. As stated above, the external shapes of the structures can be created with high accuracy by the first conventional method but the information on the heights of the structures cannot be completely created. If the information on the heights of the structures near each base station and the structures at positions visible from the base station are not correct, degree of an influence of erroneous estimation of phenomena including reflection, transmission and diffraction at the structures increases because of arrival of radio components having relatively high electric power at the structures.

Specifically, the first conventional method causes a great deterioration in accuracy in a height direction to begin with and, therefore, results in an insufficient method for estimation of radio propagation characteristics with high accuracy. Besides, as stated above, if other structures are closed together around the data creation target structure, the accuracy further deteriorates. Due to this, an urban area where structures are closed together, in particular, causes deterioration in the accuracy of estimating radio propagation.

Furthermore, the second conventional method has the problem that the information on the structures near each base station and the structures located at the positions visible from the base station, which structures are important for the estimation of radio propagation, cannot be obtained if those structures are invisible from the road. Besides, since a base station of a portable telephone is often disposed at a position having a height slightly larger than an average height of surrounding structures of the base station, the attached penthouse and the signboard provided on the roof of each of the surrounding structures have great influence on the estimation. The second conventional method cannot deal with such situations. This results in the deterioration in the accuracy for the estimation of radio propagation similarly to the first conventional method.

It is an object of the present invention to provide a three-dimensional map data creation system and a three-dimensional map data creation method capable of ensuring high accuracy in a height direction of a structure near a base station in a radio communication system so as to highly accurately estimate radio propagation characteristics from the base station. It is another object of the present invention to provide a three-dimensional map data creation system and a three-dimensional map data creation method capable of reflecting situations such as an attached penthouse and a signboard on a roof of a structure near a base station in a radio communication system so as to highly accurately estimate radio propagation characteristics from the base station.

Solution to Problem

According to the present invention, there is provided a three-dimensional map data creation system for creating three-dimensional map data including an external shape and a height of each of structures, including: a unit for acquiring the external shape from already acquired two-dimensional map data, and obtaining the height using a photograph in which the structures described in the two-dimensional map data are imaged, wherein the photograph is taken from a high-altitude part or a rooftop of a structure having a height larger than an average height of the structures.

According to the present invention, there is provided a three-dimensional map data creation method for creating three-dimensional map data including an external shape and a height of each of structures, including a step of: acquiring the external shape from already acquired two-dimensional map data, and obtaining the height using a photograph in which the structures described in the two-dimensional map data are imaged, wherein the photograph is taken from a high-altitude part or a rooftop of a structure having a height larger than an average height of the structures.

According to the present invention, there is provided a three-dimensional map data creation program for causing a computer to execute a three-dimensional map data creation method for creating three-dimensional map data including an external shape and a height of each of structures, the method including a step of: acquiring the external shape from already acquired two-dimensional map data, and obtaining the height using a photograph in which the structures described in the two-dimensional map data are imaged, wherein the photograph is taken from a high-altitude part or a rooftop of a structure having a height larger than an average height of the structures.

Advantageous Effects of Invention

A first advantage of the present invention is as follows. Since radio propagation characteristics from each base station in the wireless communication system are estimated highly accurately, it is possible to provide the three-dimensional map data creation system and the three-dimensional map data creation method ensuring particularly high accuracy in a height direction of a structure near the base station. The reason derives from use of a photograph taken from a position at which the base station is disposed if the height of the structure is to be obtained. Such a photograph is taken from a direction in which a side surface of the structure the height of which is to be created is viewed almost from a front surface. Due to this, height information is not greatly compressed and even structures invisible from a road can be recognized.

A second advantage of the present invention is as follows. Since radio propagation characteristics from each base station in the wireless communication system are estimated highly accurately, it is possible to provide the three-dimensional map data creation system and the three-dimensional map data creation method reflecting situations such as an attached penthouse and a signboard on a roof of the structure near the base station. The reason derives from use of a photograph taken from a position at which the base station is disposed if the height of the structure is to be obtained. Such a photograph is taken in such a form that a structure the height of which is to be created is looked down from obliquely upward. Due to this, the situations such as the attached penthouse and the signboard on the roof of the structure can be recognized.

BRIEF DESCRIPTION OF DRAWINGS

FIG. 13 is a functional block diagram showing an outline of an example of carrying out the present invention.

REFERENCE SIGNS LIST

Figure 1:
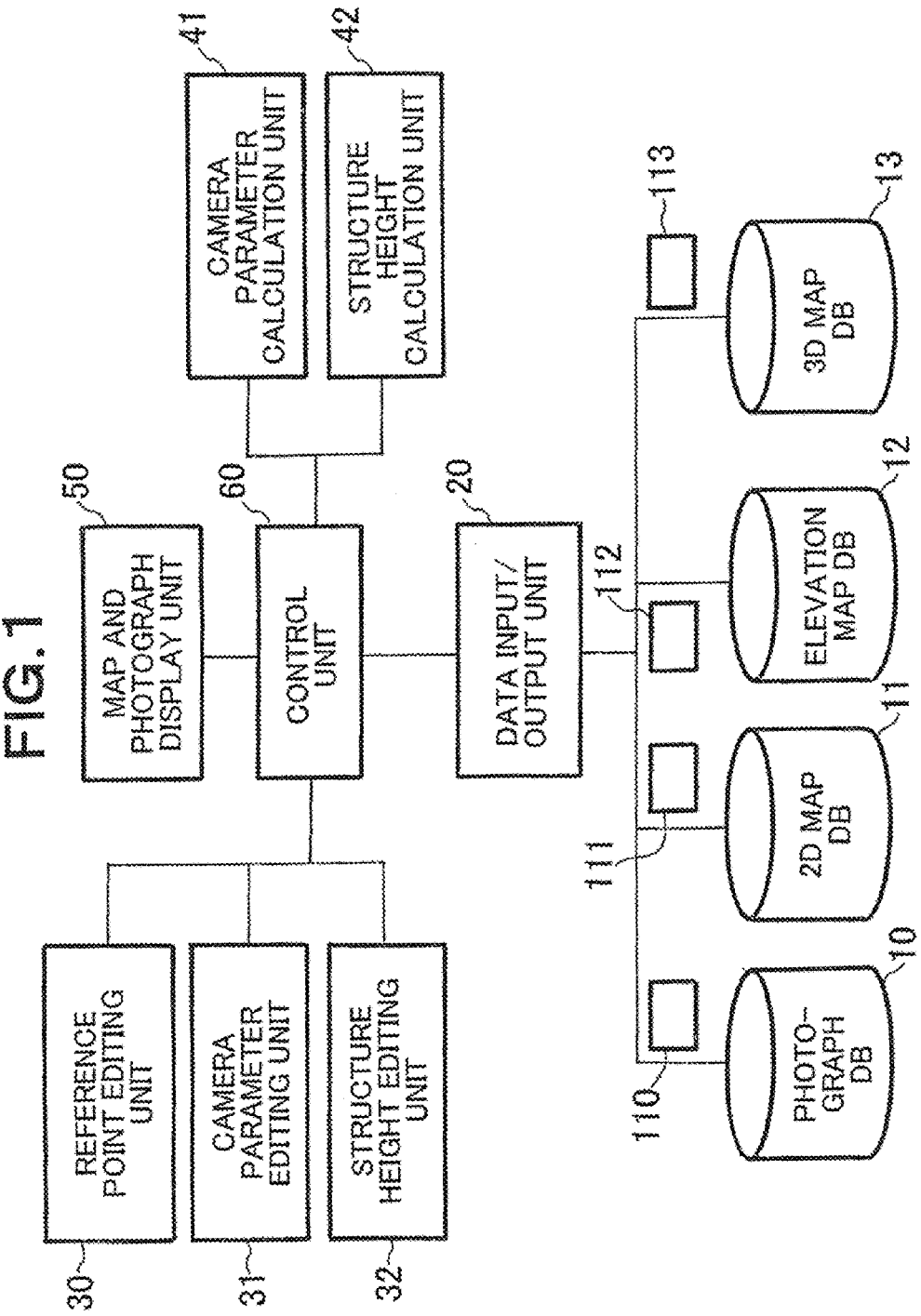
FIG. 1 is a functional block diagram showing an outline of a first embodiment of the present invention.

10 Photograph database
11 Two-dimensional map database
12 Elevation map database
13 Three-dimensional map database
20 Data input/output unit
30 Reference point editing unit
31 Camera parameter editing unit
32 Structure height editing unit
33 Other-than-map-elements editing unit 41 Camera parameter calculation unit
42 Structure height calculation unit
50 Map and photograph display unit
60 Control unit
70 Network
110 Photograph data
111 Two-dimensional map data
112 Elevation map data
113 Three-dimensional map data {Description of Embodiments}

Description of embodiments will next be described in detail with reference to the drawings. FIG. 1 is a functional block diagram showing an outline of a first embodiment of the present invention. Referring to FIG. 1, the first embodiment of the present invention is configured to include a photograph database (photograph DB) 10, a two dimensional map database (2D map DB) 11, an elevation map database (an elevation map DB) 12, a three-dimensional map database (3D map DB) 13, a data input/output unit 20, a reference point editing unit 30, a camera parameter editing unit 31, a structure height editing unit 32, a camera parameter calculation unit 41, a structure height calculation unit 42, a map and photograph display unit 50 and a control unit 60.

The photograph DB 10 stores there in photographs of structures serving as 3D map data creation targets. These photographs are taken from a high-altitude part or a rooftop of a structure having a height larger than an average height of the structures serving as subjects. Furthermore, it is preferable that these photographs are taken not by enlarging one structure but taken so that a plurality of structures is photographed along with a ground such as a road or a garden. It is also preferable that as many camera parameters as possible are stored for each of the photographs. The camera parameters are a position (Tx, Ty, Tz: unknown quantity of 3) and a posture ($\theta x$, $\theta y$, $\theta z$: unknown quantity of 3) of a camera at the time of shooting, which parameters serve as external parameters, and a focal length (f: unknown quantity of 1), coordinates of a center of an image (u0, v0: unknown quantity of 2), a scale factor (ku, kv: unknown quantity of 2) and a shear factor (ks: unknown quantity of 1), which parameters serve, as internal parameters. That is, the camera parameters are twelve parameters in all.

The 2D map DB 11 stores therein two-dimensional (hereinafter, "2D") map data based on which the 3D map data is created. It is to be noted that the 2D map data stored in the 2D map DB 11 is preferably digital 2D map data in which (X, Y) coordinates of each of map elements such as individual structures and roads are described in the form of numeric data such as a latitude and a longitude. It is also preferable that information on the number of floors is stored for each of the structures.

The elevation map DB 12 stores therein elevation data based on which the 3D map data is created. It is to be noted that the elevation data stored in the elevation map DB 12 is preferably digital elevation map data in which elevations at respective points are described in the form of numeric data. Commercially available databases can be used as the 2D map DB 11 and the elevation map DB 12.

The 3D DB 13 stores therein 3D map data including a height of each structure finally decided by the structure height editing unit 32 and the structure height calculation unit 41.

The data input/output unit 20 functions to select a photograph 110, 2D map data 111, elevation map data 112 as data necessary to create the 3D map data from the photograph DB 10, the 2D map DB 11 and the elevation map DB 12 and to feed these pieces of data to the control unit 60. Further, the data input/output unit 20 functions to store the 3D map data 113 including the height of each structure finally decided by the structure height editing unit 32 and the structure height calculation unit 42 in the 3D map DB 13.

The reference point editing unit 30 functions to be able to receive and change and/or delete reference points each representing an identical point between the photograph 110 and the 2D map data 111. The camera parameter editing unit 31 functions to display the camera parameters stored in the photograph 111 for every parameter and to be able to receive and change those parameters. The structure height editing unit 32 functions to be able to receive and change the height of each structure described in the 2D map data 111.

The camera parameter calculation unit 41 functions to calculate the camera parameters for the photograph 110 based on the data fed by the reference point editing unit 30 or the camera parameter editing unit 31. The structure height calculation unit 42 functions to calculate the height of each structure in the 2D map data 111 based on the camera parameters fed by the camera parameter editing unit 31 or the camera parameter calculation unit 41.

The map and photograph display unit 50 functions to display the photograph 111 and the 2D map data 111 on a screen. The map and photograph display unit 50 preferably functions to display the 2D map data 111 in 3D as if the 2D map is obtained by photographing under the same conditions as those for the photograph 110 based on the camera parameters fed by the camera parameter editing unit 31 and the camera parameter calculation unit 41. At that time, the map and photograph display unit 50 can display the 2D map data 111 in 3D to be closer to actuality by reflecting the structure height data fed by the structure height editing unit 32 and the structure height calculation unit 42 and the elevation data in the elevation map data 112. Furthermore, the map and photograph display unit 50 preferably functions to change the 2D map data 111 displayed in 3D in cooperation with changes in values by the camera parameter editing unit 31, the structure height editing unit 32, the camera parameter calculation unit 41 and the structure height calculation unit 51. If the map and photograph display unit 50 includes such functions, an operator who creates the 3D map data can easily edit the camera parameters and the height of each structure by comparing the photograph 110 with the 2D map data 111 displayed in 3D.

The control unit 60 is a CPU that controls these unit 20 to 50.

Figure 3:
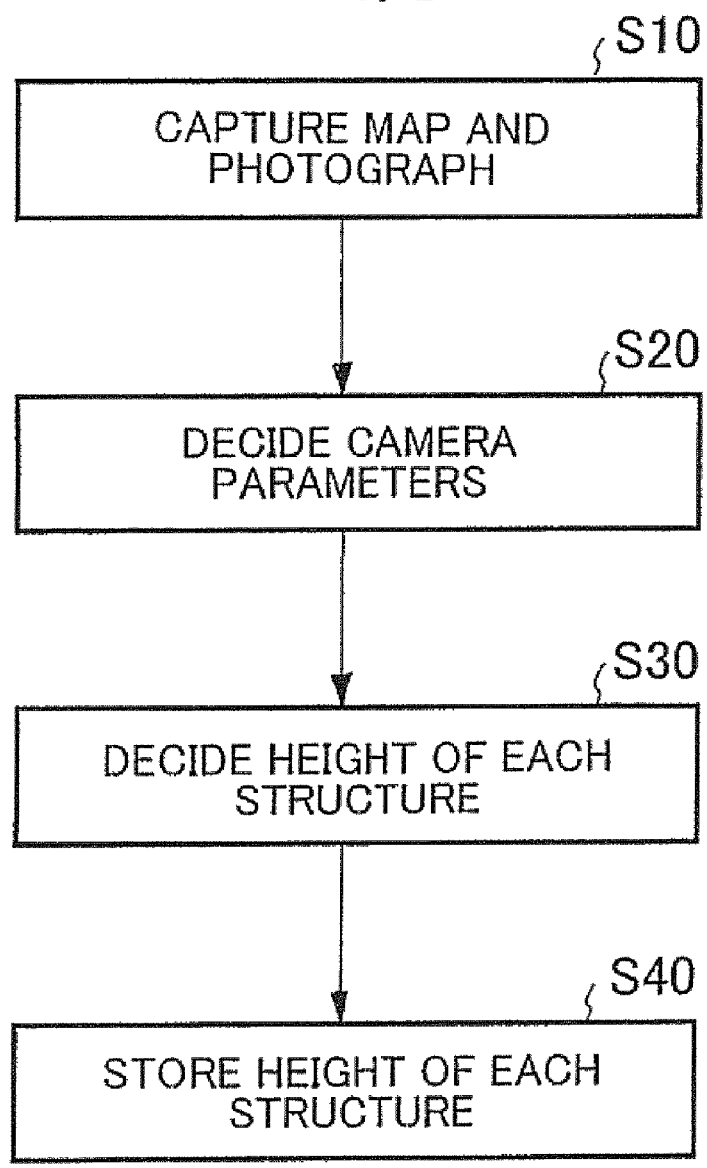
FIG. 3 is a flowchart showing an outline of operation performed by the first embodiment of the present invention.

FIG. 3 is a flowchart showing an outline of operation shown in FIG. 1. According to the first embodiment of the present invention, first, the data input/output unit 20 selects the photograph 110, the 2D map data 111 and the elevation map data 112 from the photograph DB 10, the 2D map DB 11 and the elevation map DB 12 and captures the photograph 110, the 2D map data 111 and the elevation map data 112 (step S10). Second, the camera parameter editing unit 31 or the camera parameter calculation unit 41 decides the camera parameters for the photograph DB 10 (step S20). The step S20 will be described later in detail. Next, the structure height editing unit 32 or the structure height calculation unit 42 decides the height of each structure present in the 2D map data 111 (step S30). The step S30 will be described later in detail. Finally, the data input/output unit 20 stores 3D map data 113 including the height of each structure decided in the step S30 in the 3D map DB 13 (step S40).

Figure 5:
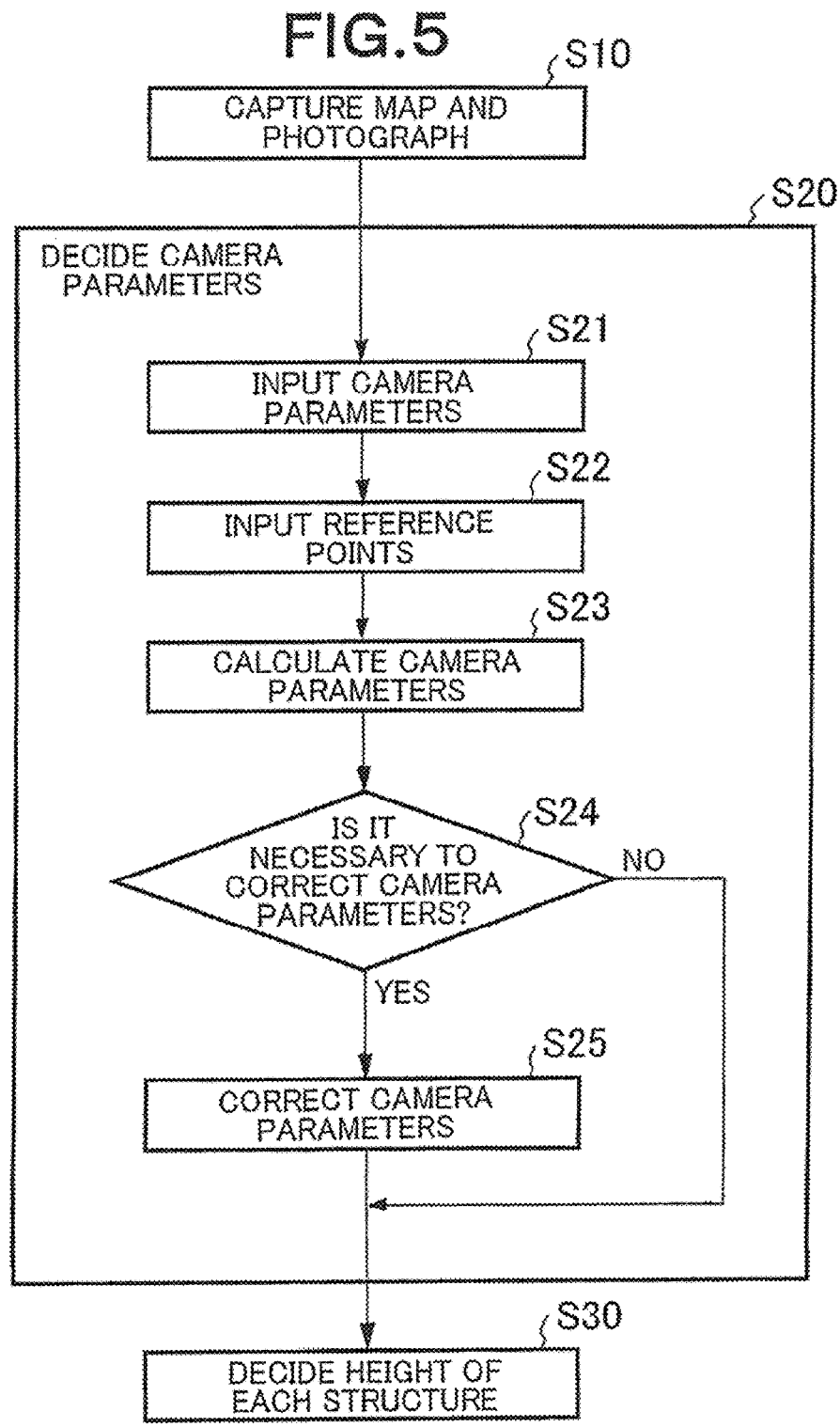
FIG. 5 is a flowchart showing a detail of a step 20 according to the embodiments of the present invention.
Figure 9:
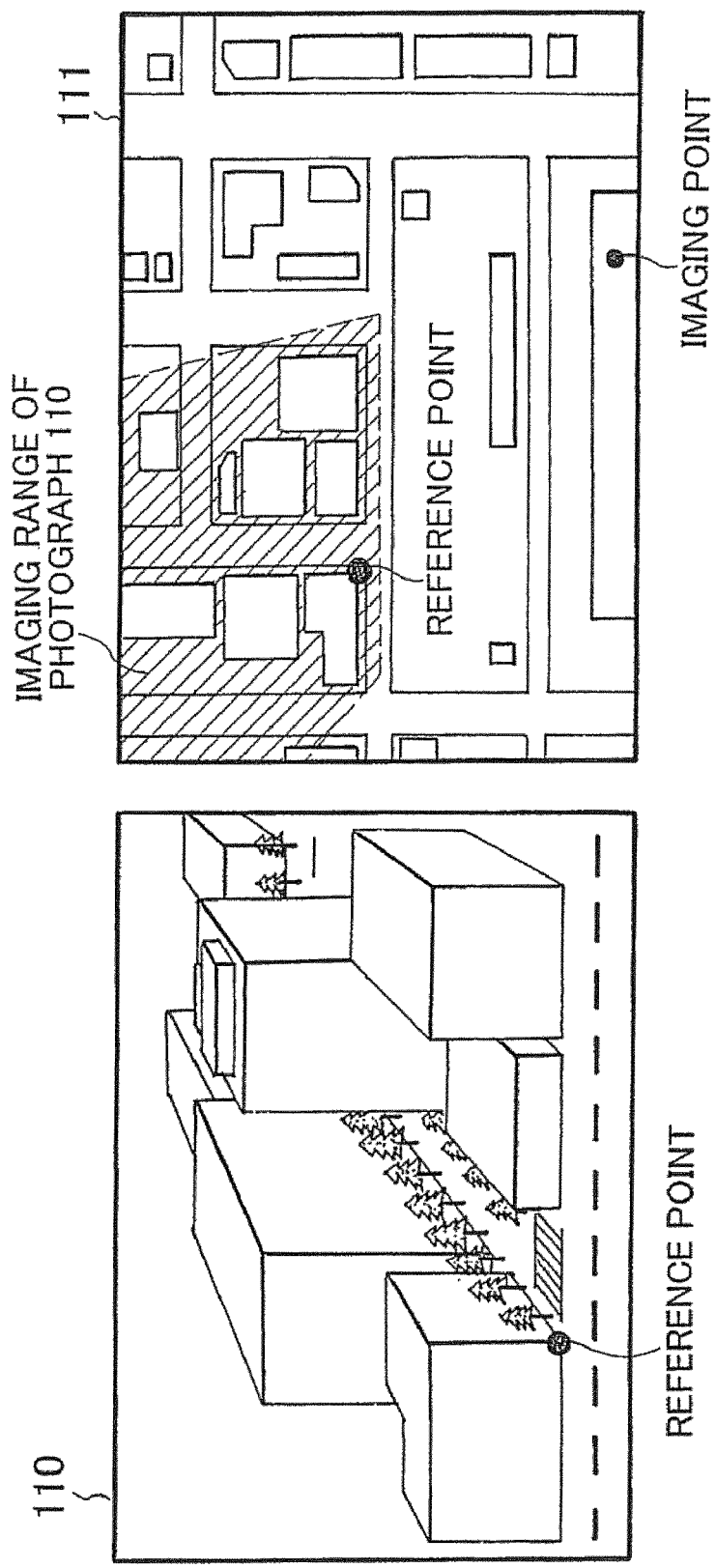
FIG. 9 illustrates examples of a photograph 110 and 2D map data 111, respectively.

A detailed flow of the step S20 will be described with reference to FIGS. 5 and 9. FIG. 9 illustrates examples of the photograph 110 and the 2D map data 111, respectively and a gray part of the 2D map data 111 corresponds to an imaging range of the photograph 110.

First, if known items include the camera parameters for the photograph 110 captured in the step S10, these known items are input to the camera parameter editing unit 31 (step S21). Next, six or more reference points representing identical points between the photograph 110 and the 2D map data 111 are input to the reference point editing unit 30 (step S22). In FIG. 9, a black circle indicates an example of the reference points. As shown in FIG. 9, by selecting characteristic points such as corners of structures as the reference points, it is easy to confirm that points selected between the photograph 110 and the 2D map data 111 are identical points. In the step S22 and a step S23 to be described later, it is necessary to pay attention to dealing with the 2D map data 111 as the 3D map data. Specifically, if the reference points are to be selected on the 2D map data 111, a Z coordinate as well as (X, Y) coordinates (such as a latitude and a longitude) at each of positions of the reference points is designated. Therefore, if each of the reference points is to be selected, it is necessary to select a ground the Z coordinate of which can be acquired from the elevation map data 112 or select a roof or the like of a structure the height of which is known. It is to be noted that only elevation data at discrete points is stored in the elevation data 112. Due to this, a point selected as the reference point often does not coincide with a point stored in the elevation data. In this case, an approximate value to elevation data around the point may be used.

Next, the camera parameter calculation unit 41 calculates the camera parameters using information on the reference points input in the step S22 (step S23). As stated above, the camera parameters are twelve parameters. However, these parameters are generalized into a camera matrix P (3×4) that represents conversion of arbitrary points (X, Y, Z) on the 2D map data 111 into points (u, v) on the photograph 110. Since the camera matrix P includes twelve elements, the camera parameter calculation unit 41 can calculate the respective elements by using the information on six or more reference points input in the step S22. Moreover, the camera parameter calculation unit 41 can calculate the twelve camera parameters. A method for calculating the camera matrix and the camera parameters using coordinates of six or more reference points is described in, for example, Non-Patent Document 2. If several camera parameters are obtained in the step S21, the camera parameter calculation unit 41 identifies only the unknown parameters by a method of least squares with these obtained parameters used as a restraint condition. Alternatively, if seven or more reference points are obtained in the step S22, the camera parameter calculation unit 41 similarly identifies the parameters by the method of least squares. By thus inputting more input camera parameters and more information on the reference points, it is possible to improve calculation accuracy for the camera matrix P and the camera parameters.

Next, the operator determines whether or not it is necessary to correct the camera parameters calculated in the step S23 (step S24). To this end, the 2D map data 111 is displayed in 3D as if the 2D map data 111 is obtained by photographing under the same conditions as those of the photograph 110 based on the camera parameters calculated in the step S23. At that time, the structures in the 2D map data 111 are given approximate heights and the 2D map data 111 is displayed in 3D while reflecting the heights. For example, if information on the number of floors of each of the structures in the 2D map data 111 is stored, the approximate height of each of the structures can be calculated based on the information on the number of floors. By displaying the 2D map data 111 in 3D, the operator who creates the 3D map data can easily determine whether or not it is necessary to correct the camera parameters calculated in the step S23 by comparing the photograph 110 with the 2D map data 111 displayed in 3D. If the operator determines that it is unnecessary to correct the camera parameters calculated in the step S23, the operator decides calculated values as the camera parameters and finishes operation in the step S20. If the operator determines that it is necessary to correct the camera parameters in the step S24, the processing goes to a step S25.

If the operator determines that it is necessary to correct the camera parameters in the step S24, the camera parameters are corrected (step S25). Specifically, the camera parameter editing unit 31 corrects the camera parameters. The 2D map data 111 displayed in 3D is changed in cooperation with changes in the values by the camera parameter editing unit 31. Due to this, the operator who creates the 3D map data can compare with photograph 110 with the 2D map data 111 displayed in 3D while editing the camera parameters and easily derive optimum camera parameters. If the operator derives the optimum parameters, the operator decides the values as the camera parameters and finishes the processing in the step S20.

Figure 6:
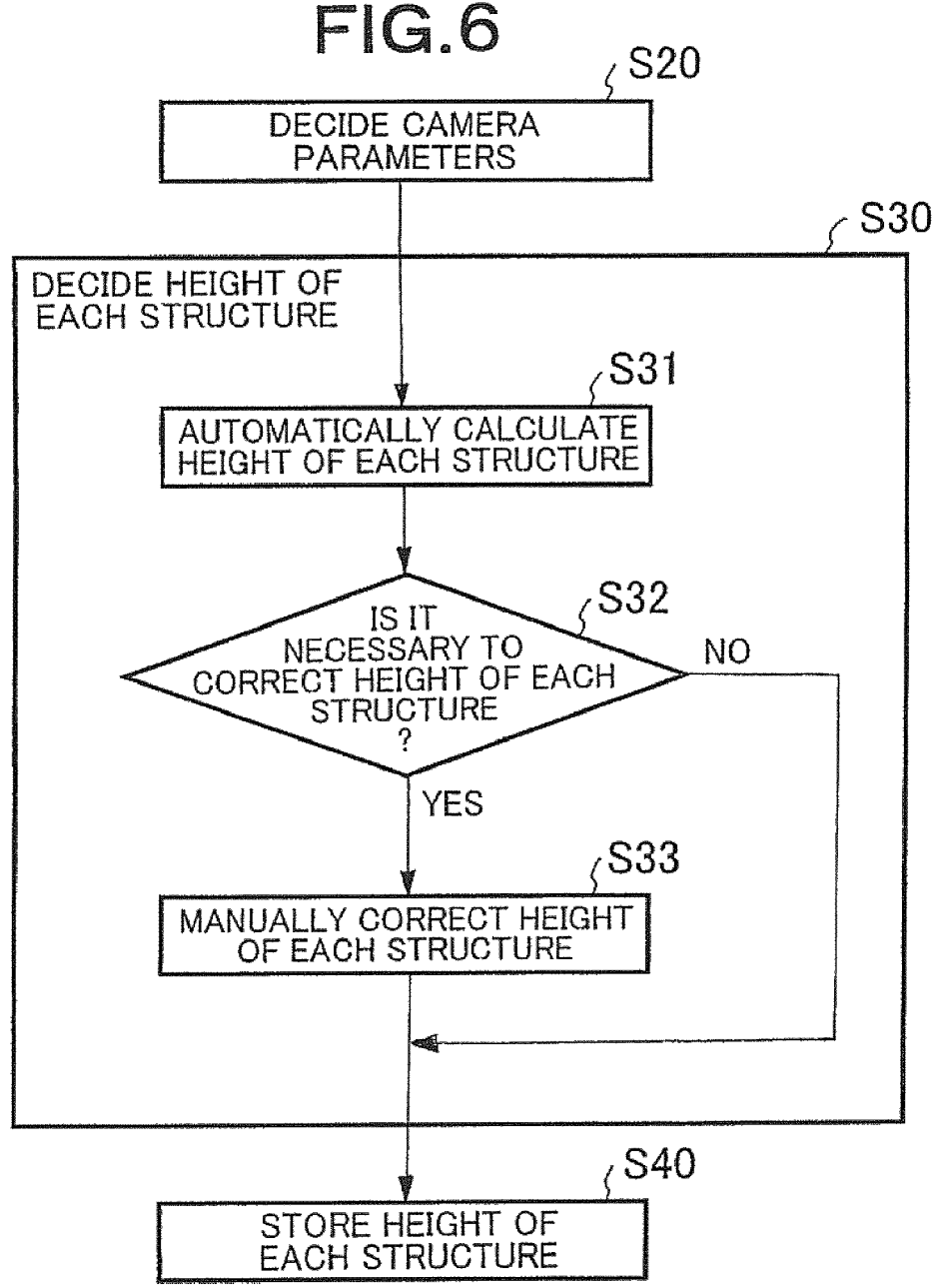
FIG. 6 is a flowchart showing a detail of a step 30 according to the embodiments of the present invention.
Figure 10:
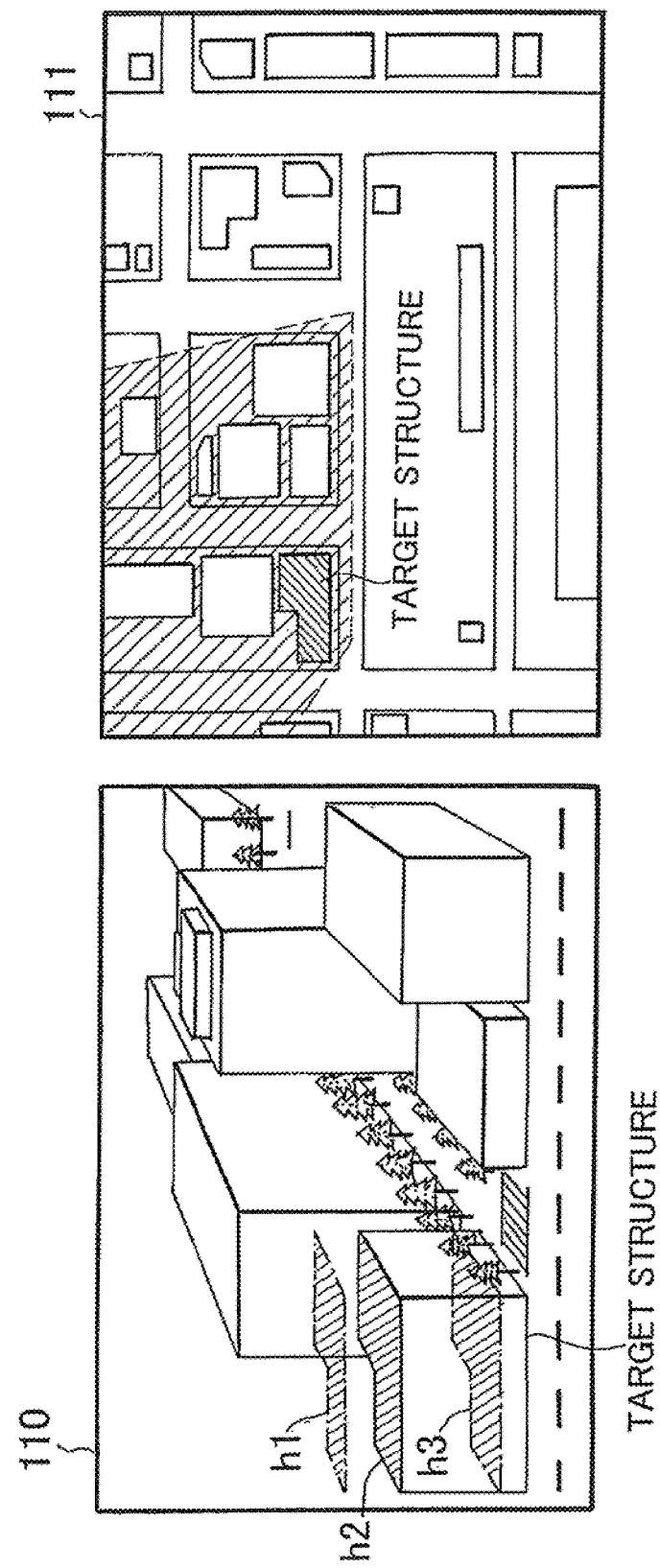
FIG. 10 shows examples of the photograph 110 and the 2D map data 111, respectively used to explain a flow including the step 30 of calculating a height of each structure by an automatic processing.

A detailed flow of the step S30 will be described with reference to FIGS. 6, 7, 10 and 11. FIG. 6 is a flowchart including a step of calculating a height of each structure by an automatic processing. FIG. 10 shows examples of the photograph 110 and the 2D map data 111, respectively used to explain the flow shown in FIG. 6. First, the height of each structure is calculated by a correlation processing between the structure in the photograph 110 and the 2D map data 111 (step 31). Specifically, an appropriate height is given to each structure in the 2D photograph data 111 and a polygon corresponding to a roof of the structure is projected onto the photograph 110 using the camera matrix P. FIG. 10 shows a state in which the polygon of a target structure indicated in gray is projected onto the photograph 110 by using the camera matrix P according to the given height of the structure. Specifically, polygons projected for heights h1, h2 and h3 are shown, respectively. Next, correlations between the polygons projected according to the given heights of the structure and the photograph 110 are calculated. In addition, the height of the structure for which a correlation value is a maximum value or the maximum height of the structure among a plurality of heights of structures for which correlation values exceed a preset threshold value is adopted. The above-stated operation is executed for all the structures present in the photograph 110 and the 2D map data 111 in common.

The operator determines whether or not it is necessary to correct the height of each structure obtained in the step S31 (step S32). To this end, the 2D map data 111 is displayed in 3D as if the 2D map data 111 is obtained by photographing under the same conditions as those for the photograph 110 based on the camera parameters decided in the step S20. At that time, the heights of the structures obtained in the step S31 are given to the structures in the 2D map data 111, respectively and the 2D map data 111 is displayed in 3D while reflecting the heights of the structures. By displaying the 2D map data 111 in 3D, the operator who creates the 3D map data can easily determine whether or not it is necessary to correct the heights of the structures calculated in the step S31 by comparing the photograph 110 with the 2D map data 111 displayed in 3D. If the operator determines that it is unnecessary to correct the heights of the structures calculated in the step S31 for all the structures present in the photograph 110 and the 2D map data 111 in common, the operator decides calculated values as the heights of the structures, respectively and finishes operation in the step S30. If the operator determines that it is necessary to correct the heights of the structures, the processing goes to a step S33.

If the operator determines that it is necessary to correct the heights of the structures in the step S32, the heights of the structures are corrected (step S33). Specifically, the structure height editing unit 32 corrects the camera parameters. The 2D map data 111 displayed in 3D is changed in cooperation with changes in the values by the structure height editing unit 32. Due to this, the operator who creates the 3D map data can compare with photograph 110 with the 2D map data 111 displayed in 3D while editing the heights of the structures and easily derive optimum heights of the structures. If the operator derives the optimum heights of the structures for all the structures present in the photograph 110 and the 2D map data 111 in common, the operator decides the values as the heights of the structures and finishes the processing in the step S30.

Figure 7:
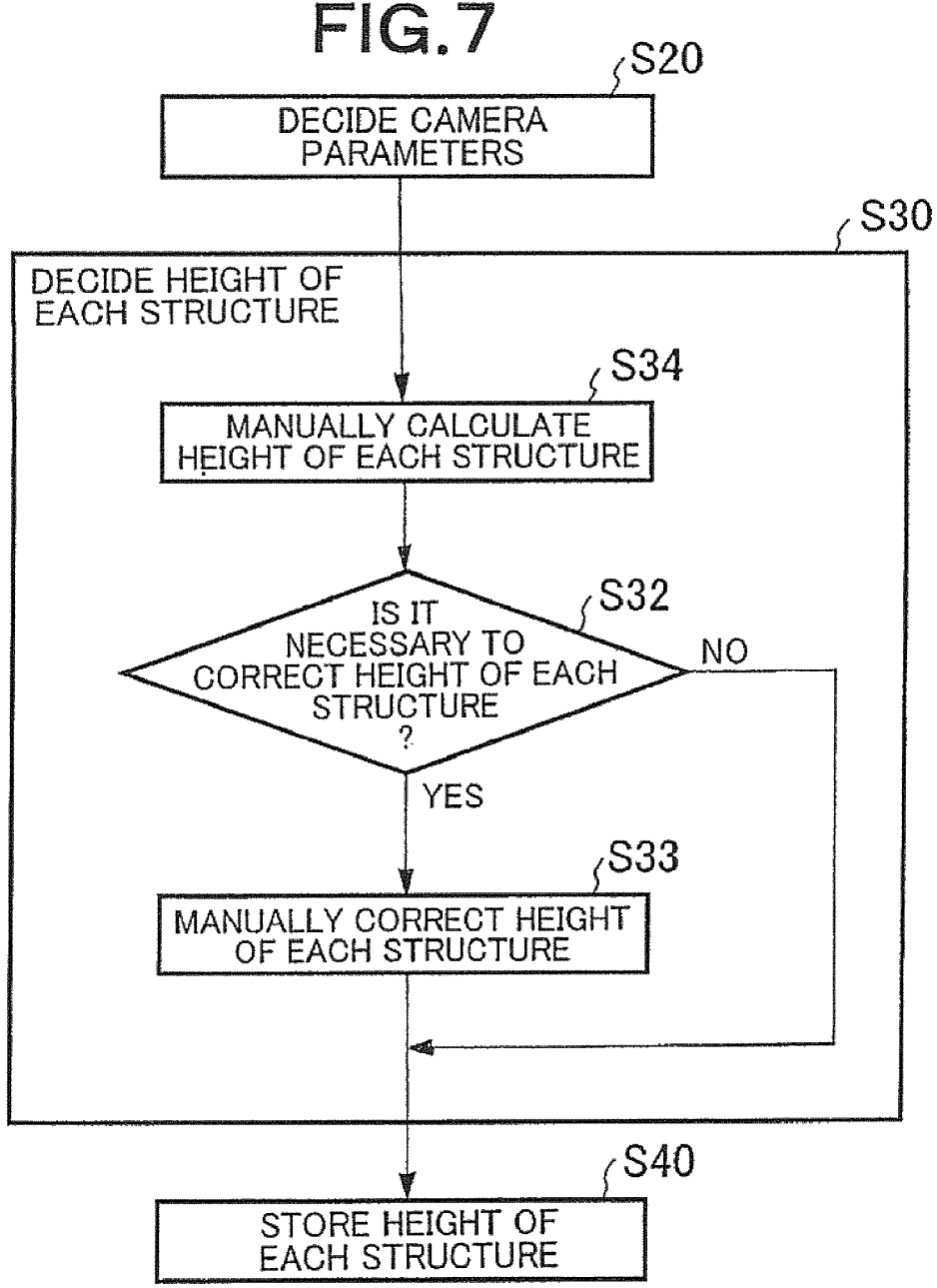
FIG. 7 is a flowchart showing a detail of the step 30 according to the embodiments of the present invention.
Figure 11:
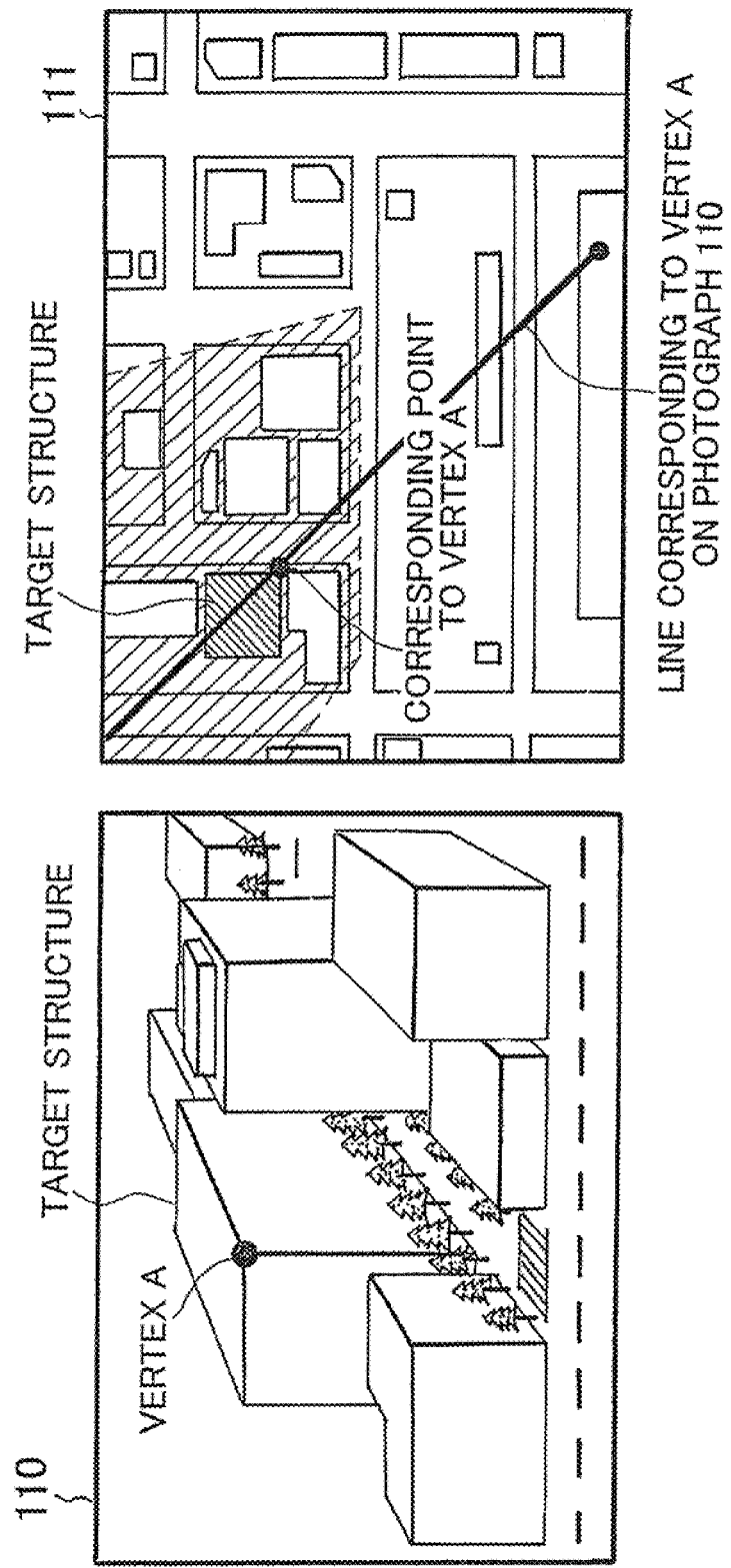
FIG. 11 shows examples of the photograph 110 and the 2D map data 111, respectively used to explain a flow including the step 30 of calculating the height of each structure by a manual processing.

FIG. 7 is a flowchart including a step of calculating heights of structures by a manual processing. FIG. 11 shows examples of the photograph 110 and the 2D map data 111 used to explain a flow shown in FIG. 7. First, the height of each structure is calculated by correspondence of the structure in the 2D map data 111 to the photograph 110 (step 34). Specifically, a vertex A on which the roof of the structure the height of which is to be calculated is first designated on the photograph 110. If an inverse matrix of the camera matrix P is used, the vertex A designated on the photograph 110 can be expressed as a three-dimensional line on the 2D map data 111. Next, a point on the 2D map data 111 corresponding to the vertex A is designated. Since (X, Y) coordinates of the point corresponding to the vertex A can be obtained from the 2D map data, a Z coordinate of the vertex A can be obtained by assigning values of the (X, Y) coordinates to an equation of the line. Namely, the height of the structure is decided. In some cases, the line does not cross the vertex A due to errors in the camera parameters or point designation. However, in this case, a Z coordinate at a closest position to the vertex A can be set as the height of the structure.

The operator then determines whether or not it is necessary to correct the heights of the structures obtained in the step S34. This processing is the same as that in the step S32 stated above. Further, if the operator determines that it is necessary to correct the heights of the structures in the step S32, the heights of the structures are corrected. This processing is the same as that in the step 33 stated above.

Figure 2:
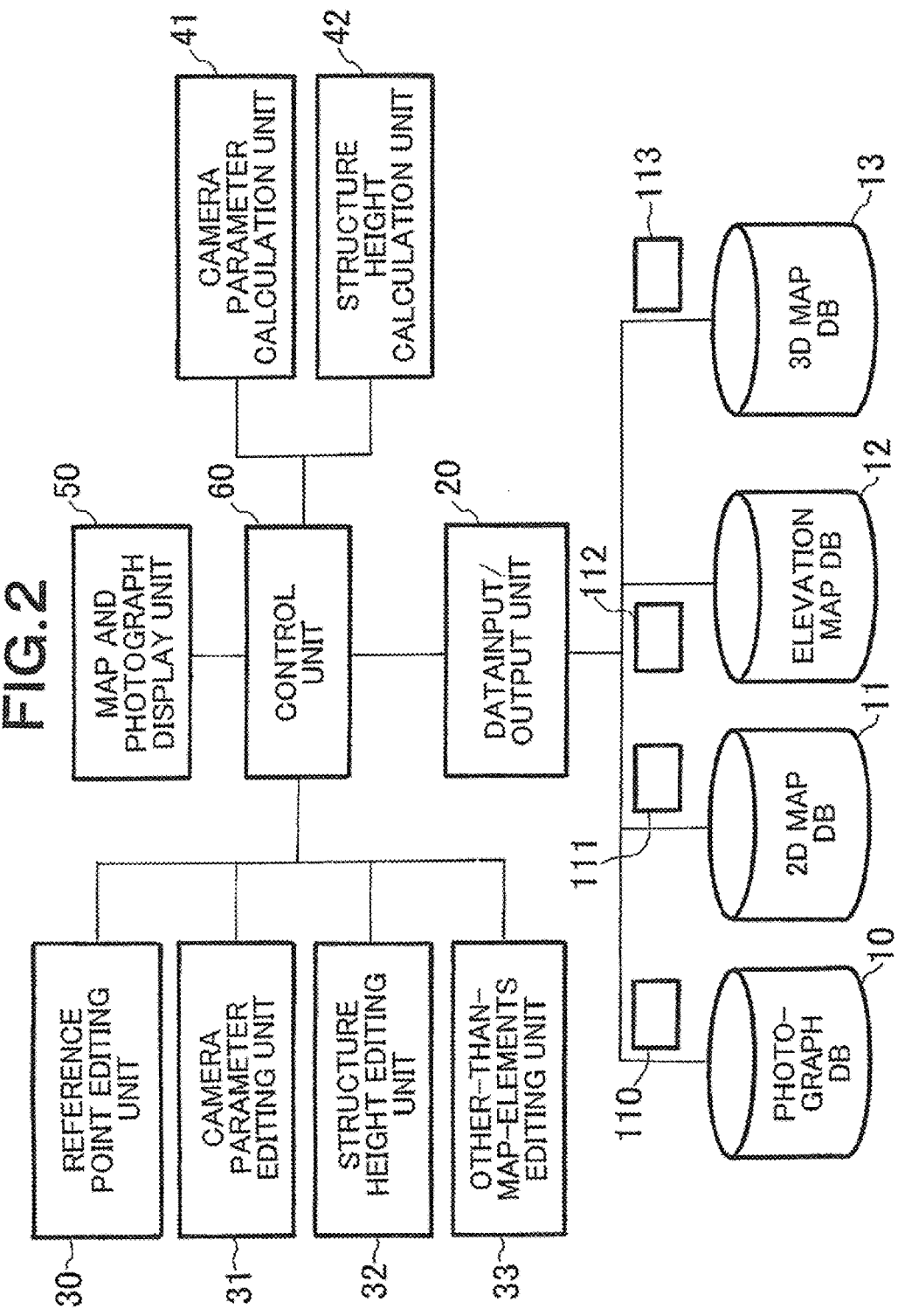
FIG. 2 is a functional block diagram showing an outline of a second embodiment of the present invention.

FIG. 2 is a functional block diagram showing an outline of a second embodiment of the present invention. Referring to FIG. 2, the second embodiment of the present invention is configured to additionally include an other-than-map-elements editing unit 33 as compared with the first embodiment.

The other-than-map-elements editing unit 33 functions to receive and change information that is not described in ordinary 2D map data such as an attached penthouse, a signboard and plants. Further, information edited by the other-than-map-elements editing unit 33 is stored in a 3D map DB 13 via a data input/output unit 20.

Figure 4:
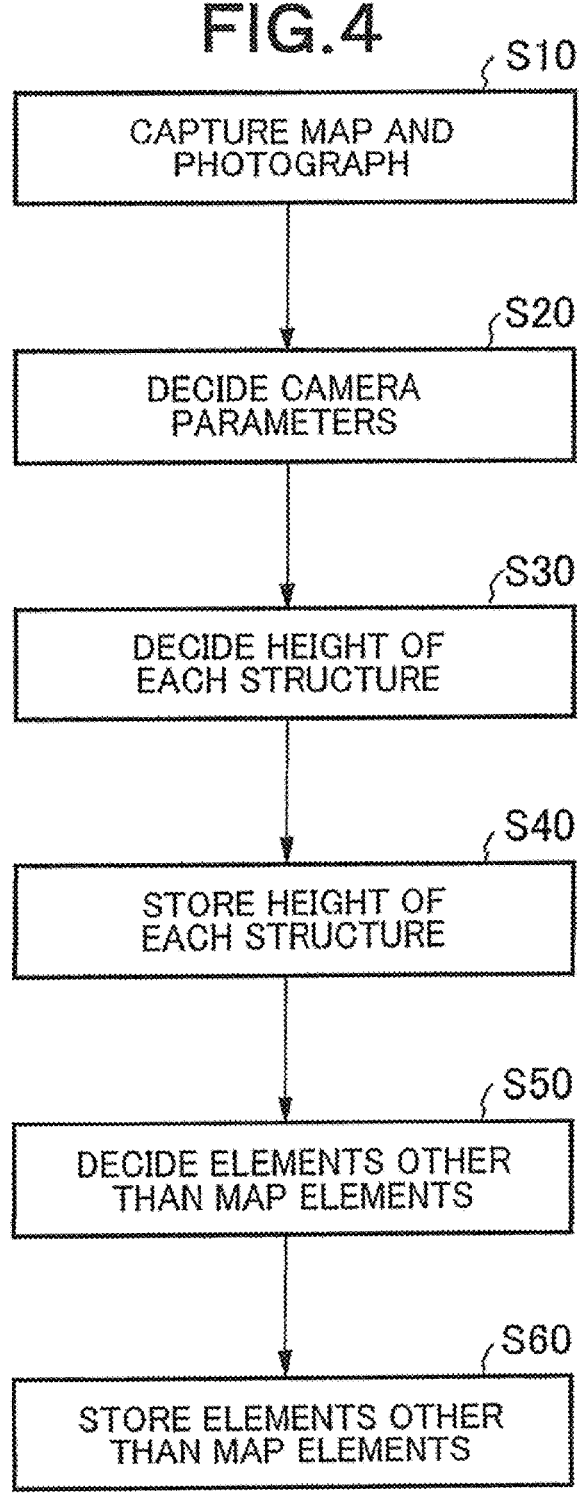
FIG. 4 is a flowchart showing an outline of operation performed by the second embodiment of the present invention.

FIG. 4 is a flowchart showing an outline of operation performed by the second embodiment of the present invention shown in FIG. 2. According to the second embodiment of the present invention, after executing processings from the step S10 to the step S40 according to the first embodiment, the other-than-map-elements editing unit 33 edits the information such as the attached penthouse and the signboard on the roof of each structure and the plants (step S50). A detail of the step S50 will be described later. Next, 3D data 113 including heights of structures decided in the step S50 is stored in the 3D map DB 13 (step 60).

Figure 8:
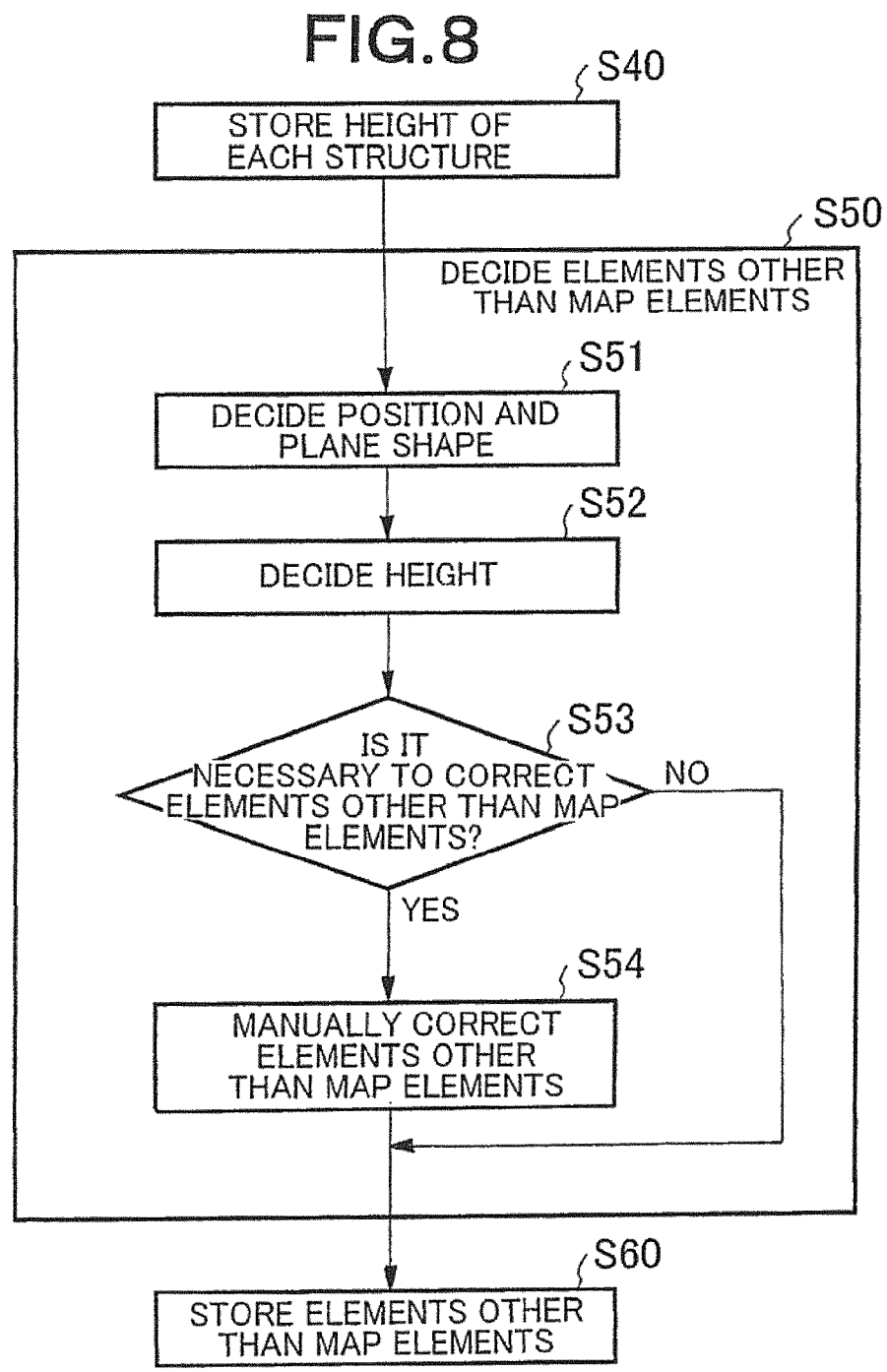
FIG. 8 is a flowchart showing a detail of a step 50 according to the embodiments of the present invention.
Figure 12:
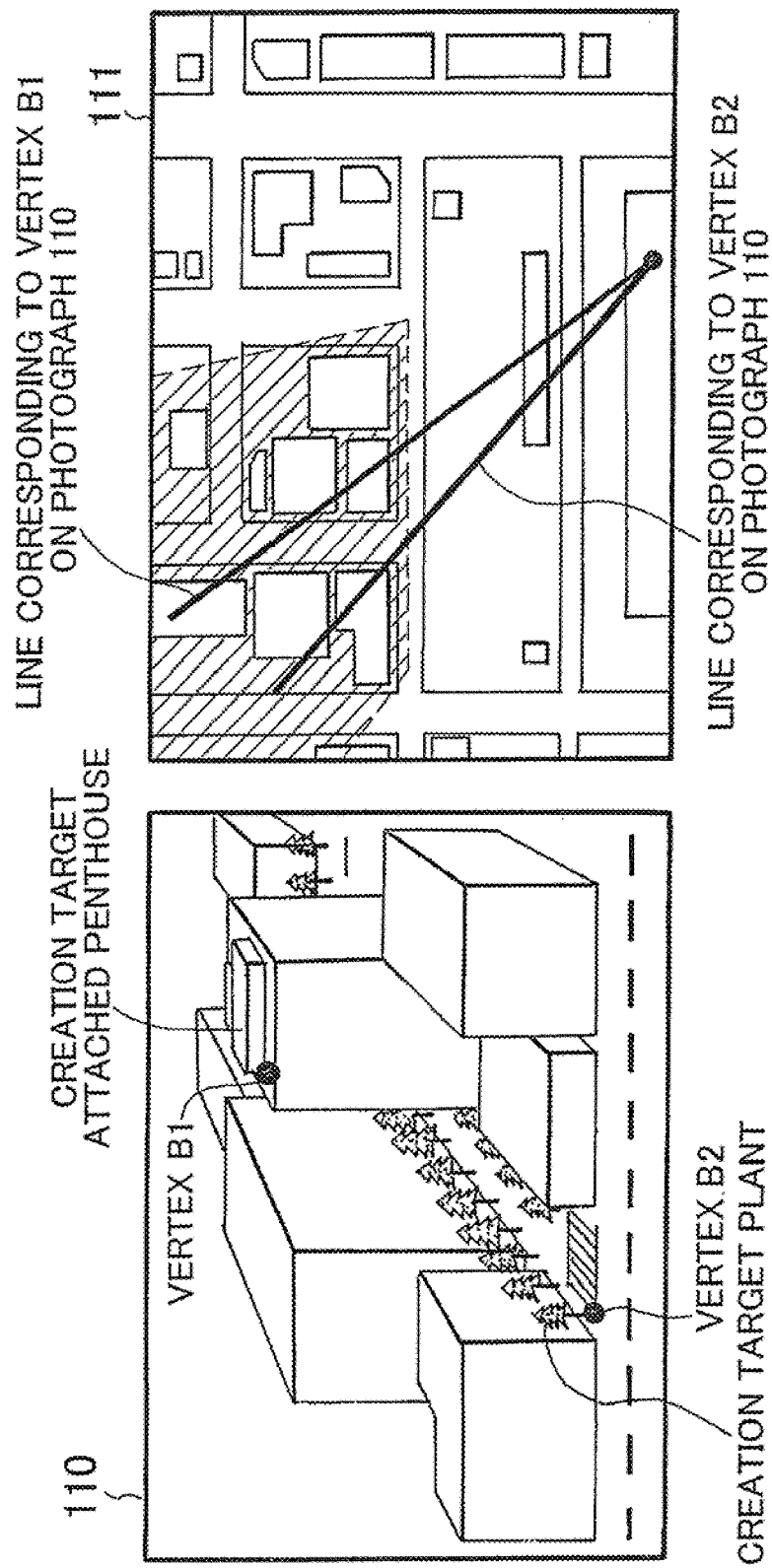
FIG. 12 shows examples of the photograph 110 and the 2D map data 111, respectively used to explain a detailed flow of the step 50.

A detailed flow of the step S50 will be described with reference to FIGS. 8 and 12. FIG. 12 shows examples of a photograph 110 and 2D map data 111, respectively used to explain the flow of the step S50. First, positions and external shapes of the attached penthouse and the signboard on the roof of each structure, the plants and the like are decided by correspondence of the photograph 110 to the 2D map 211 to which heights of structures are given (step S51). Specifically, a point B at a location where an attached penthouse or a signboard on the roof of each structure or a plant is designated on the photograph 110. At this time, it is necessary that a Z coordinate of the point B is known. However, if the point B corresponds to the attached penthouse or signboard on the roof of the structure, the Z coordinate can be calculated from an elevation at the location and a height of the structure. If the point B corresponds to a plant, an elevation at the location can be set as the Z coordinate of the point B. If an inverse matrix of the camera matrix P is used, the vertex B designated on the photograph 110 is expressed as a three-dimensional line on the 2D map data 111. Further, since the Z coordinate of the point B is known, (X, Y) coordinates of the vertex B can be obtained by assigning a value of the Z coordinate to an equation of the line. Namely, a position of the point at which the attached penthouse, the signboard or the plant stands decided. If a creation target is a polygon such as the attached penthouse, this processing is performed on all vertexes of the polygon and a polygon expressing an external shape of the creation target is created. At that time, the vertexes are often partially covered as shown in FIG. 12. However, in this case, the external shape of the creation target can be recognized from an image of an upper surface given on the photograph. In case of FIG. 12, for example, it is possible to easily recognize that an external shape of the attached penthouse is a rectangle.

Next, heights of the attached penthouse, the signboard and the plants are decided (step S52). A processing in the step S52 is the same as that in the step S34.

It is next determined whether or not it is necessary to correct the heights of the structures obtained in the step S52 (step S53). This processing is the same as that in the step S32. If it is determined that it is necessary to correct the heights of the structures in the step S53, the heights of the structures are corrected (step S54). This processing is the same as that in the step S33.

EXAMPLES

Operation in the best modes for carrying out the present invention will be described using specific examples. In this case, an instance of applying the 3D map data created by the present invention to estimation of radio propagation in a wireless communication system will be considered. In such a case, it is preferable that the photograph 110 is taken from a location where a base station antenna is disposed in the wireless communication system. By using such a photograph, it is possible to create 3D map data having high accuracy in a height direction and reflecting situations such as the attached penthouse or the signboard on the roof of each structure for the structure near the base station that is important for the estimation of radio propagation. Furthermore, a person installing and designing the antenna and serving as a user of the estimation of radio propagation often owns a latitude, a longitude, a height and the like of the base station antenna as a database. In such a case, by inputting these pieces of data as camera parameters in the step 21, calculation accuracy for the camera matrix P and the camera parameters can be improved. A method for creating the 3D map data using such a photograph is already described in description of embodiments.

Next, an example of a service providing the 3D map data created by the present invention to a user who owns the photograph by asking the user to transmit data on the photograph will be described. FIG. 13 is a functional block diagram for realizing the service. Referring to FIG. 13, this example is configured to include the 2D map DB 11, the elevation map DB 12, the 3D map DB 13, the data input/output unit 20, the reference point editing unit 30, the camera parameter editing unit 31, the structure height editing unit 32, the camera parameter calculation unit 41, the structure height calculation unit 42, the map and photograph display unit 50 and the control unit 60 shown in the first embodiment as well as a network 70.

Functions of the 2D map DB 11, the elevation map DB 12, the 3D map DB 13, the data input/output unit 20, the reference point editing unit 30, the camera parameter editing unit 31, the structure height editing unit 32, the camera parameter calculation unit 41, the structure height calculation unit 42, the map and photograph display unit 50 and the control unit 60 are the same as those described in Description of embodiments.

The network 70 functions to transmit the photograph 111 provided from the user to the data input/output unit 20. The network 70 also includes a unit for transmitting the 3D map data created by the present invention to the user. A method for creating the 3D map data 113 by using the photograph is the same as that described in description of embodiments.

While the example of using the photograph provided from the user has been described as a change from the first embodiment, the example can be a change from the second embodiment.

Moreover, the devices shown in FIGS. 1 and 2 can be realized by hardware, software or a combination of the hardware and the software.

The present application is the National Phase of PCT/JP2007/072523, filed Nov. 21, 2007, which is based on and claims priority from Japanese Patent Application No. 2006-314261 (filed on Nov. 21, 2006) which is incorporated herein in its entirety.

The typical embodiments of the present invention have been described in detail. However, it is to be understood that various changes, substitutions and alternatives can be made without departure from the spirit and the scope of the invention defined in the claims. Moreover, the inventor contemplates that an equivalent range of the claimed invention is kept even if the claims are amended in proceedings of the application.

{Industrial Applicability}

The present invention can be applied to a purpose such as highly accurate estimation of radio propagation characteristics for assisting in arrangement of base stations, base units and the like in a wireless communication system for portable telephones, a wireless LAN or the like and optimization of parameters for the arranged base stations, base units and the like.

The invention claimed is:

1. A three-dimensional electronic map data creation system for creating three-dimensional electronic map data including an external shape and a height of each buildings which are located in scope of sight of a base station antenna used in a wireless communication system, comprising:
a hardware implemented unit for acquiring said external shape from already acquired two-dimensional electronic map data, and obtaining said height using both said acquired two-dimensional electronic map data and a photograph in which the buildings described in said two-dimensional electronic map data are imaged, wherein:
said photograph is taken from a high-altitude part of or a rooftop of a building having a height larger than an average height of said buildings, wherein the high-altitude part or the rooftop is positioned at which said base station antenna is disposed; and
said photograph comprises a building near said base station antenna in said wireless communication system providing a wireless communication service.

2. The three-dimensional electronic map data creation system according to claim 1, comprising: a hardware-implemented unit for causing a user to input camera parameters to the unit and to edit the camera parameters; a hardware-implemented unit for causing the user to input the height of each of the buildings to the unit and to edit the height of each of the buildings; a hardware-implemented unit for calculating the camera parameters and a camera matrix based on points made to correspond to each other as an identical point between said photograph and said two-dimensional map; and a hardware-implemented unit for calculating the height of each of the buildings based on said camera matrix, wherein a part of or all items of the camera parameters input by said user are input based on a database of the base station antenna.

3. The three-dimensional electronic map data creation system according to claim 2, wherein said two-dimensional electronic map data to which said height of each of the buildings is given is displayed in three dimensions under photographing conditions given by said camera parameters.

4. The three-dimensional electronic map data creation system according to claim 3, wherein said two-dimensional electronic map data displayed in three dimensions is updated in cooperation with changes in said camera parameters and in said height of each of the buildings.

5. The three-dimensional electronic map data creation system according to claim 1, wherein a position, an external shape and a height of an object that is imaged on said photograph but that is not described in said two-dimensional electronic map data as a map element are calculated based on a camera matrix.

6. The three-dimensional electronic map data creation system according to claim 1, wherein said photograph is provided from a user via a network which is capable of connecting to said unit, and said three-dimensional data is provided to the user via the network.

7. A three-dimensional electronic map data creation system according to claim 1, wherein information on number of floors is stored in each of the buildings in said two-dimensional map.

8. A three-dimensional electronic map data creation system according to claim 1, wherein said hardware implemented unit includes:
an identification section which identifies reference points representing identical points between said two-dimensional electronic map data and said photograph on the X-Y-Z coordinates;
a camera parameter calculation section which calculates a camera parameters with respect to said photograph as a camera matrix on the basis of said reference points which are represented on said X-Y-Z coordinates; and
a building height calculation section which calculates said height of said building to be obtained on the basis of said camera matrix.

9. A three-dimensional electronic map data creation system according to claim 8, wherein said building height calculation section includes:
a projection part which gives respectively different heights to each of said buildings described in said two-dimensional electronic map data, and projects, onto said photograph in accordance with said given height, a polygon corresponding to said height of said building to be obtained on the basis of said camera matrix; and a building height calculation part which calculates correlation values between said projected polygon and said photograph every said given height, and adopts, as said height of said building to be obtained, a height of said building corresponding to said correlation value when said correlation value is a maximum value or a maximum height of said building among a plurality of said heights of said buildings corresponding to said correlation values in a case where said correlation values exceed a preset threshold value.

10. A three-dimensional electronic map data creation system according to claim 8, wherein said building height calculation section includes:

a representation part which represents a three-dimensional line on said two-dimensional electronic map data, corresponding to a vertex of said building which is designated on said photograph; and a building height calculation part which calculates (X, Y) coordinates of a point corresponding to said vertex of said building on the basis of an inverse matrix of said camera matrix, and obtains, as said height of said building to be obtained, Z coordinates of said point by assigning said calculated (X, Y) coordinates to an equation corresponding to said represented three-dimensional line.

11. A three-dimensional electronic map data creation system for creating three-dimensional electronic map data including an external shape and a height of each buildings which are located in scope of sight of a base station antenna used in a wireless communication system, comprising:

a hardware implemented unit for acquiring said external shape from already acquired two-dimensional electronic map data, and obtaining said height using both said acquired two-dimensional electronic map data and a photograph in which the buildings described in said two-dimensional electronic map data are imaged, wherein:

said photograph is taken from a high altitude part and on a building floor identical to a floor of a same structure on which said base station antenna of said wireless communication system that provides a wireless communication service is disposed in an area including one of said buildings, wherein the high-altitude part has a height larger than an average height of said buildings; and said photograph comprises a building near said base station antenna in said wireless communication system providing a wireless communication service.

12. The three-dimensional electronic map data creation system according to claim 11, comprising: a hardware-implemented unit for causing a user to input camera parameters to the unit and to edit the camera parameters; a hardware-implemented unit for causing the user to input the height of each of the buildings to the unit and to edit the height of each of the buildings; a hardware-implemented unit for calculating the camera parameters and a camera matrix based on points made to correspond to each other as an identical point between said photograph and said two-dimensional map; and a hardware-implemented unit for calculating the height of each of the buildings based on said camera matrix, wherein a part of or all items of the camera parameters input by said user are input based on a database of the base station antenna.

13. The three-dimensional electronic map data creation system according to claim 12, wherein said two-dimensional electronic map data to which said height of each of the buildings is given is displayed in three dimensions under photographing conditions given by said camera parameters.

14. The three-dimensional electronic map data creation system according to claim 13, wherein said two-dimensional electronic map data displayed in three dimensions is updated in cooperation with changes in said camera parameters and in said height of each of the buildings.

15. The three-dimensional electronic map data creation system according to claim 11, wherein a position, an external shape and a height of an object that is imaged on said photograph but that is not described in said two-dimensional electronic map data as a map element are calculated based on a camera matrix.

16. The three-dimensional electronic map data creation system according to claim 11, wherein said photograph is provided from a user via a network which is capable of connecting to said unit, and said three-dimensional data is provided to the user via the network.

17. A three-dimensional electronic map data creation system according to claim 11, wherein information on number of floors is stored in each of the buildings in said two-dimensional map.

18. A three-dimensional electronic map data creation method for creating three-dimensional map data including an external shape and a height of each buildings which are located in scope of sight of a base station antenna used in a wireless communication system, comprising steps:

that a control unit acquires said external shape from already acquired two-dimensional electronic map data; and that said control unit obtains said height using both said acquired two-dimensional Electronic map data and a photograph in which the buildings described in said two-dimensional electronic map data are imaged, wherein:

said photograph is taken from a high-altitude part of or a rooftop of a building having a height larger than an average height of said buildings, wherein the high-altitude part or the rooftop is positioned at which said base station antenna is disposed; and said photograph comprises a building near said base station antenna in said wireless communication system providing a wireless communication service.

19. The three-dimensional electronic map data creation method according to claim 18, comprising the steps of: causing a user to input camera parameters to the unit and to edit the camera parameters; causing the user to input the height of each of the buildings to the unit and to edit the height of each of the buildings; calculating the camera parameters and a camera matrix based on points made to correspond to each other as an identical point between said photograph and said two-dimensional map; and calculating the height of each of the buildings based on said camera matrix, wherein a part of or all items of the camera parameters input by said user are input based on a database of the base station antenna.

20. The three-dimensional electronic map data creation method according to claim 19, wherein said two-dimensional electronic map data to which said height of each of the buildings is given is displayed in three dimensions under photographing conditions given by said camera parameters.

21. The three-dimensional electronic map data creation method according to claim 20, wherein said two-dimensional electronic map data displayed in three dimensions is updated in cooperation with changes in said camera parameters and in said height of each of the buildings.

22. The three-dimensional electronic map data creation method according to claim 18, wherein a position, an external shape and a height of an object that is imaged on said photograph but that is not described in said two-dimensional electronic map data as a map element are calculated based on a camera matrix.

23. The three-dimensional electronic map data creation method according to claim 18, wherein said photograph is provided from a user via a network which is capable of connecting to said control unit, and said three-dimensional data is provided to the user via the network.

24. A three-dimensional electronic map data creation method according to claim 18, wherein information on number of floors is stored in each of the buildings in said two-dimensional map.

25. A three-dimensional electronic map data creation method for creating three-dimensional map data including an external shape and a height of each of buildings which are located in scope of sight of a base station antenna used in a wireless communication system, comprising steps:
that a control unit acquires said external shape from already acquired two-dimensional electronic map data, and
that said control unit obtains said height using both said acquired two-dimensional electronic map data and a photograph in which the buildings described in said two-dimensional electronic map data are imaged, wherein:
said photograph is taken from a high altitude part and on a building floor identical to a floor of a same structure on which said base station antenna of said wireless communication system that provides a wireless communication service is disposed in an area including one of said buildings, wherein the high-altitude part has a height larger than an average height of said buildings; and
said photograph comprises a building near said base station antenna in said wireless communication system providing a wireless communication service.

26. The three-dimensional electronic map data creation method according to claim 25, comprising the steps of: causing a user to input camera parameters to the unit and to edit the camera parameters; causing the user to input the height of each of the buildings to the unit and to edit the height of each of the buildings; calculating the camera parameters and a camera matrix based on points made to correspond to each other as an identical point between said photograph and said two-dimensional map; and calculating the height of each of the buildings based on said camera matrix, wherein a part of or all items of the camera parameters input by said user are input based on a database of the base station antenna.

27. The three-dimensional electronic map data creation method according to claim 26, wherein said two-dimensional electronic map data to which said height of each of the buildings is given is displayed in three dimensions under photographing conditions given by said camera parameters.

28. The three-dimensional electronic map data creation method according to claim 27, wherein said two-dimensional electronic map data displayed in three dimensions is updated in cooperation with changes in said camera parameters and in said height of each of the buildings.

29. The three-dimensional electronic map data creation method according to claim 25, wherein a position, an external shape and a height of an object that is imaged on said photograph but that is not described in said two-dimensional electronic map data as a map element are calculated based on a camera matrix.

30. The three-dimensional electronic map data creation method according to claim 25, wherein said photograph is provided from a user via a network which is capable of connecting to said control unit, and said three-dimensional data is provided to the user via the network.

31. A three-dimensional electronic map data creation method according to claim 25, wherein information on number of floors is stored in each of the buildings in said two-dimensional map.

32. A non-transitory computer-readable recording medium that stores three-dimensional electronic map data creation program for causing a computer to execute a three-dimensional map data creation method for creating three-dimensional electronic map data including an external shape and a height of each of buildings which are located in scope of sight of a base station antenna used in a wireless communication system, said method including a step of:
acquiring said external shape from already acquired two-dimensional electronic map data, and obtaining said height using both said acquired two-dimensional electronic map data and a photograph in which the buildings described in said two-dimensional electronic map data are imaged, wherein:
said photograph is taken from a high-altitude part of or a rooftop of a building having a height larger than an average height of said buildings, and the high-altitude part or the rooftop is positioned at which said base station antenna is disposed, and
said photograph comprises a building near said base station antenna in said wireless communication system providing a wireless communication service.

33. The three-dimensional electronic map data creation program according to claim 32, said method including the steps of: causing a user to input camera parameters to the unit and to edit the camera parameters; causing the user to input the height of each of the buildings to the unit and to edit the height of each of the buildings; calculating the camera parameters and a camera matrix based on points made to correspond to each other as an identical point between said photograph and said two-dimensional map; and calculating the height of each of the buildings based on said camera matrix, wherein a part of or all items of the camera parameters input by said user are input based on a database of the base station antenna.

34. The three-dimensional electronic map data creation program according to claim 33, wherein said two-dimensional electronic map data to which said height of each of the buildings is given is displayed in three dimensions under photographing conditions given by said camera parameters.

35. The three-dimensional electronic map data creation program according to claim 34, wherein said two-dimensional electronic map data displayed in three dimensions is updated in cooperation with changes in said camera parameters and in said height of each of the buildings.

36. The three-dimensional electronic map data creation program according to claim 32, wherein a position, an external shape and a height of an object that is imaged on said photograph but that is not described in said two-dimensional electronic map data as a map element are calculated based on a camera matrix.

37. The three-dimensional electronic map data creation program according to claim 32, wherein said photograph is provided from a user via a network which is capable of connecting to said computer, and said three-dimensional data is provided to the user via the network.

38. A three-dimensional electronic map data creation program according to claim 32, wherein information on number of floors is stored in each of the buildings in said two-dimensional map.

39. A non-transitory computer-readable recording medium that stores three-dimensional electronic map data creation program for causing a computer to execute a three-dimensional electronic map data creation method for creating three-dimensional map data including an external shape and a height of each of buildings which are located in scope of sight of a base station antenna used in a wireless communication system, said method including a step of:

acquiring said external shape from already acquired two-dimensional electronic map data, and obtaining said height using both said acquired two-dimensional electronic map data and a photograph in which the buildings described in said two-dimensional electronic map data are imaged, wherein:

said photograph is taken from a high altitude part and on a building floor identical to a floor of a same structure on which said base station antenna of said wireless communication system that provides a wireless communication service is disposed in an area including one of said buildings, wherein the high-altitude part has a height larger than an average height of said buildings; and said photograph comprises a building near said base station antenna in said wireless communication system providing a wireless communication service.

40. The three-dimensional electronic map data creation program according to claim 39, said method including the steps of: causing a user to input camera parameters to the unit and to edit the camera parameters; causing the user to input the height of each of the buildings to the unit and to edit the height of each of the buildings; calculating the camera parameters and a camera matrix based on points made to correspond to each other as an identical point between said photograph and said two-dimensional map; and calculating the height of each of the buildings based on said camera matrix, wherein a part of or all items of the camera parameters input by said user are input based on a database of the base station antenna.

41. The three-dimensional electronic map data creation program according to claim 40, wherein said two-dimensional electronic map data to which said height of each of the buildings is given is displayed in three dimensions under photographing conditions given by said camera parameters.

42. The three-dimensional electronic map data creation program according to claim 41, wherein said two-dimensional electronic map data displayed in three dimensions is updated in cooperation with changes in said camera parameters and in said height of each of the buildings.

43. The three-dimensional electronic map data creation program according to claim 39, wherein a position, an external shape and a height of an object that is imaged on said photograph but that is not described in said two-dimensional electronic map data as a map element are calculated based on a camera matrix.

44. The three-dimensional electronic map data creation program according to claim 39, wherein said photograph is provided from a user via a network which is capable of connecting to said computer, and said three-dimensional data is provided to the user via the network.

45. A three-dimensional electronic map data creation program according to claim 39, wherein information on number of floors is stored in each of the buildings in said two-dimensional map.

* * * * *